US005652646A

United States Patent [19]

Murayama et al.

[11] Patent Number: 5,652,646

[45] Date of Patent: Jul. 29, 1997

[54] IMAGING APPARATUS AND METHOD WITH MEANS FOR SETTING THE AMOUNT OF LEADER AND TRAILER USED DURING FILM TRANSPORT AND PRINTING

[75] Inventors: Tsutomu Murayama; Masashi Yahara, both of Yokohama, Japan

[73] Assignee: Canon Kabushiki Kaisha, Tokyo, Japan

[21] Appl. No.: 537,124

[22] Filed: Sep. 29, 1995

[30] Foreign Application Priority Data

Oct. 7, 1994 [JP] Japan .................................... 6-270331

[51] Int. Cl.$^6$ ............................ G03B 21/00; G03B 27/44

[52] U.S. Cl. .................................. 355/54; 355/64; 355/77

[58] Field of Search .................................. 355/53, 54, 46, 355/64, 39, 40, 41, 77; G03B 21/00, 27/465, 27/47, 27/44, 27/42

[56] References Cited

U.S. PATENT DOCUMENTS

| | | | |
|---|---|---|---|
| Re. 28,046 | 6/1974 | Renold | 355/54 |
| 3,972,610 | 8/1976 | Gross | 355/7 |
| 4,174,174 | 11/1979 | Hunter, Jr. et al. | 355/39 |
| 4,760,428 | 7/1988 | Watanabe et al. | 355/40 |
| 5,166,726 | 11/1992 | Matsumoto et al. | 355/54 |
| 5,208,627 | 5/1993 | Yoshihara et al. | 355/23 |

*Primary Examiner*—Arthur T. Grimley
*Assistant Examiner*—Herbert V. Kerner
*Attorney, Agent, or Firm*—Fitzpatrick, Cella, Harper & Scinto

[57] ABSTRACT

In an imaging apparatus for forwardly and reversely photographing images on two rows of film, the leader of the film is transported in a set amount before starting photographing images on the first row, and after photographing on the second row terminates, the trailer of the film is transported in an amount set on the basis of the amount of the leader transport.

23 Claims, 15 Drawing Sheets

IMAGING APPARATUS AND METHOD WITH MEANS FOR SETTING THE AMOUNT OF LEADER AND TRAILER USED DURING FILM TRANSPORT AND PRINTING

BACKGROUND OF THE INVENTION

1. Field of the Invention

The present invention relates to an imaging apparatus for recording an original document, such as a check, on a recording medium, such as a microfilm.

2. Description of the Related Art

Conventionally, a typical example of this type of imaging apparatus is a rotary camera. A description will be given below using this rotary camera as an example.

In the rotary camera, photographs are continuously taken while performing exposure through a slit while both a subject and a film (recording medium) are being moved in synchronization with a reduction ratio. Therefore, it is possible to take a great number of photographs at a high speed.

A subject fed from a paper feed entrance is transported at a constant speed and passed through an exposure section. During this time, an image of the subject illuminated by a lamp is formed into an image on a film by a lens through a plurality of mirrors and slits.

An apparatus is known having a plurality of imaging sections for the purpose of simultaneously taking photographs on a plurality of films. Further, an apparatus having the function of taking a film storage section out of the camera body is known. Also, an apparatus is known having recording means, such as a memory, for recording information, such as the number of photographs taken, in the film storage section.

To prevent an image from being formed on a foggy portion of a film, formed by, for example, exposure to external light, when a long film is stored in the main body or the film storage section, an apparatus is known having the function of transporting a film (leader transport) by the amount of exposure (the foggy portion) to the external light when the film is stored before taking photographs.

Similarly, to prevent an image from being impaired because the image is exposed to external light when a long photographed film is taken out of the main body or the film storage section, an apparatus is known having the function of, before the film is taken out, transporting a film (trailer transport) for the amount of the portion exposed (the foggy portion) to external light at the time when the film is taken out.

FIG. 13 shows an example of a rotary camera. An imaging apparatus 101 comprises a supply section 102 for supplying a sheet-like subject S' into the main body of the apparatus, an ejection section 103 for ejecting the photographed subject S' out of the main body of the apparatus, a transport section 104 on the upstream side, an exposure section 105, and a transport section 106 on the downstream side, the sections 104, 105 and 106 being disposed in this order between the supply section 102 and the ejection section 103. The subject S' transported to the exposure section 105 is formed into an image on a film F via an optical system 107 to be described later.

Each section of the apparatus is arranged as described below. A housing cover 110 covers the entire apparatus, the lower edge of the housing cover 110 is brought into contact with the peripheral edge of a base 108, and the housing cover 110 is pivoted in the back end of the base 108 by a hinge 109 so as to be openable and closable in the forward direction towards which the housing cover 110 opens. In a frame 111 assembled on the base 108, the upstream-side transport section 104 and the exposure section 105 are disposed in the lower portion of the frame 111, the supply section 102 is disposed in the front end portion 111*a* of the frame 111, and the downstream-side transport section 106 and the ejection section 103 are disposed in the upper portion of the frame 111. The optical system 107 is mainly disposed on one side thereof, and a drive system (not shown) is disposed on the other side. A film compartment 112 in which the film F is stored is disposed in front of the supply section 102, a subject detection sensor 113 is disposed in the upper portion of the upstream-side transport section 104 toward the upstream direction. The subject detection sensor 113 detects the passing of the subject S' in order to control the shutter near the projection lens. The exposure section 105 is illuminated by a pair of illuminating lamps 114 and 114', and comprises a pair of parallel guide glasses 115 and 116 spaced from each other through which the subject S' is passed.

As an imaging method in a rotary camera, there is a simplex photographing method in which images of a subject are taken starting at the leading edge of the film and continuing over the entire width of a long microfilm with the photographing terminating at the trailing edge of the film. Such an imaging method also provides a forward/reverse photographing method (a dual photographing method) in which the microfilm width is divided into upper and lower halves, and when images are photographed in the entire first row of the upper half, the film is turned upside down and images are photographed along the second row of the lower half of the film. An imaging apparatus in which a film compartment for loading a microfilm can be mounted and dismounted as a camera unit has been designed. Some of these imaging apparatuses make forward/reverse photographing possible by turning the camera unit upside down.

However, in a conventional rotary camera, as in a case where a film is stored at an ordinarily illuminated place and the film is taken out of the imaging apparatus in a place with a small amount of exposure, such as a darkroom, the area exposed to external light may be different between when the film is loaded in the body or the film compartment and when the film is taken out of the body or the film compartment. In order to not transport the film more than necessary at this time, in some cases the leader transport and the trailer transport are set at a different amount of transport. When forward/reverse photographing is performed by such an imaging apparatus, the leader transport portion and the trailer transport portion overlap on the film. As a result, problems arise, for example, when the amount of trailer transport is smaller than the amount of leader transport, the image is impaired due to reexposure in the forward photographing portion during the forward/reverse photographing, or, when the amount of trailer transport is greater than the amount of leader transport, film is wasted.

FIGS. 14 and 15 are each an illustration of a film when forward/reverse photographing is performed by using a conventional imaging apparatus. FIG. 14 is an illustration of a film Fc when forward/reverse photographing is performed in a state in which the amount $X_{L1}$ of leader transport is greater than the amount $X_{T1}$ of trailer transport. FIG. 15 is an illustration of a film Fd when forward/reverse photographing is performed in a state in which the amount $X_{T2}$ of trailer transport is greater than the amount $X_{L2}$ of trailer transport.

In the film Fc of FIG. 14, the film Fc is inserted into the imaging apparatus, and the leader of the film is transported by the amount $X_{L1}$ of leader transport from a point 1401. When a point 1402 is reached, forward photographing of the forward/reverse photographing is performed. When a point 1403 is reached during forward photographing, the film is reversed and reverse photographing is performed from a point 1404. The remaining amount of film is checked during the reverse photographing so that a point 1405 of the position where the trailer transport starts is determined on the basis of the amount $X_{T1}$ of trailer transport, and photographing is performed up to the point 1405 such that a point 1406 is reached when the trailer transport terminates. Here, trailer transport is performed, and the point 1406 is reached. When such an operation is performed, in the film Fc, the image indicated by the shaded portion Qc during the reverse photographing of the forward/reverse photographing is formed into an image in the portion (the foggy portion) exposed to external light during the leader transport, and therefore the image is impaired.

In a film Fd of FIG. 15, the film Fd is inserted into the imaging apparatus, the leader thereof is transported by the amount $X_{L2}$ of leader transport from a point 1501 until a point 1502 is reached, and forward photographing of the forward/reverse photographing is performed. When a point 1503 is reached during forward photographing, the film is reversed and reverse photographing is performed from a point 1504. The remaining amount of film is checked during the reverse photographing so that a point 1505 of the position where the trailer transport starts is determined on the basis of the amount $X_{T2}$ of trailer transport, and photographing is performed up to the point 1505 such that a point 1506 is reached when the trailer transport terminates. Here, the trailer is transported, and the point 1506 is reached. When such an operation is performed, on the film Fd, there is an extra space indicated by the shaded portion Qd during reverse photographing of the forward/reverse photographing, and film Fd is wasted.

In an imaging apparatus configured in such a manner that the main unit of the imaging apparatus and the film compartment can be dismounted, if the film compartment is mounted in another imaging apparatus while a photograph is being taken, the above-described problems occur without the user becoming aware of this fact.

SUMMARY OF THE INVENTION

The present invention has been arranged to solve the above-described problems of the prior art. It is an object of present invention to provide an imaging apparatus in which an image is prevented from being exposed to a foggy portion of the film during forward/reverse photographing, and thus the recording medium is not wasted.

In accordance with one aspect of the invention, an imaging apparatus for forwardly and reversely photographing images on two rows of a recording medium includes imaging means for recording an image onto the recording medium, transport means for forwardly and reversely transporting the recording medium between a supply section and a take-up section, first setting means for setting the amount of leader transport on the first row of the recording medium to a first value, and second setting means for setting the amount of trailer transport on the second row of the recording medium to a second value on the basis of the amount of the leader transport set by the first setting means. In addition, transport control means controls the amounts of the leader transport and trailer transport of the recording medium on the basis of the values set by the first and second setting means.

In accordance with another aspect of the invention, imaging means includes a camera unit which contains the supply section, the take-up section and the transport means. In addition, a main unit houses the camera unit, which can be mounted and dismounted therefrom.

In accordance with another aspect of the invention, an imaging apparatus for forwardly and reversely photographing images on two rows of a recording medium comprises imaging means for recording an image onto the recording medium, leader transport means for transporting a leader of the recording medium on the first row at which forward photographing is performed, and trailer transport means for transporting a trailer of the recording medium on the second row at which reverse photographing is performed. In addition, first setting means sets the amount of the leader of the recording medium, and second setting means sets the amount of the trailer of the recording medium based on the amount of the leader set by the first setting means.

In yet another aspect of the invention, a method for operating an imaging apparatus for forwardly and reversely photographing images on two rows of a recording medium comprises the steps of supporting the recording medium between a supply section and take-up section for movement in a forward direction and a reverse direction, setting the amount of leader transport on the first row of the recording medium to a first set value, recording images of an original document on the first row of the recording medium as it moves in the forward direction, reversing the direction of movement of the recording medium, recording images of an original document on the second row of the recording medium as it moves in the reverse direction, and setting the amount of the trailer transport on the second row of the recording medium based on the amount of the set leader transport. In addition, the amounts of the leader transport and the trailer transport of the recording medium are controlled on the basis of the first and second values.

A plurality of camera units having a recording medium in a roll form housed therein can be mounted and dismounted in the main unit of the apparatus, and the camera unit has a storing section in which data for the amounts of the leader transport and trailer transport is stored. Further, even if the amounts of the leader transport and trailer transport are changed in the process of forward/reverse photographing, data for the amounts of the leader transport and trailer transport at the time they are changed is stored in the storing section inside the camera unit.

In the imaging apparatus constructed as described above, when forward/reverse photographing is performed, the amounts of the leader transport and trailer transport are made to coincide with predetermined set values and the leader and the trailer are transported. Thus, the use portions of the recording medium coincide with each other for forward and reverse photographing.

In an imaging apparatus such that a plurality of camera units are provided in which a recording medium is housed in a roll form which can be mounted and dismounted from the main unit of the apparatus, the camera unit has a storing section, and data for the amounts of the leader transport and trailer transport is stored in the storing section of the camera unit. Thus, even when a camera unit is inserted into a different imaging apparatus, the same operation as that described above can be performed.

The above and further objects, aspects and novel features of the invention will more fully appear from the following detailed description when read in connection with the accompanying drawings.

DESCRIPTION OF THE PREFERRED EMBODIMENTS

Preferred embodiments of the present invention will be explained below with reference to the accompanying drawings.

[First Embodiment]

A first embodiment of the present invention will be described below with reference to FIGS. 1 to 7.

Figure 1:
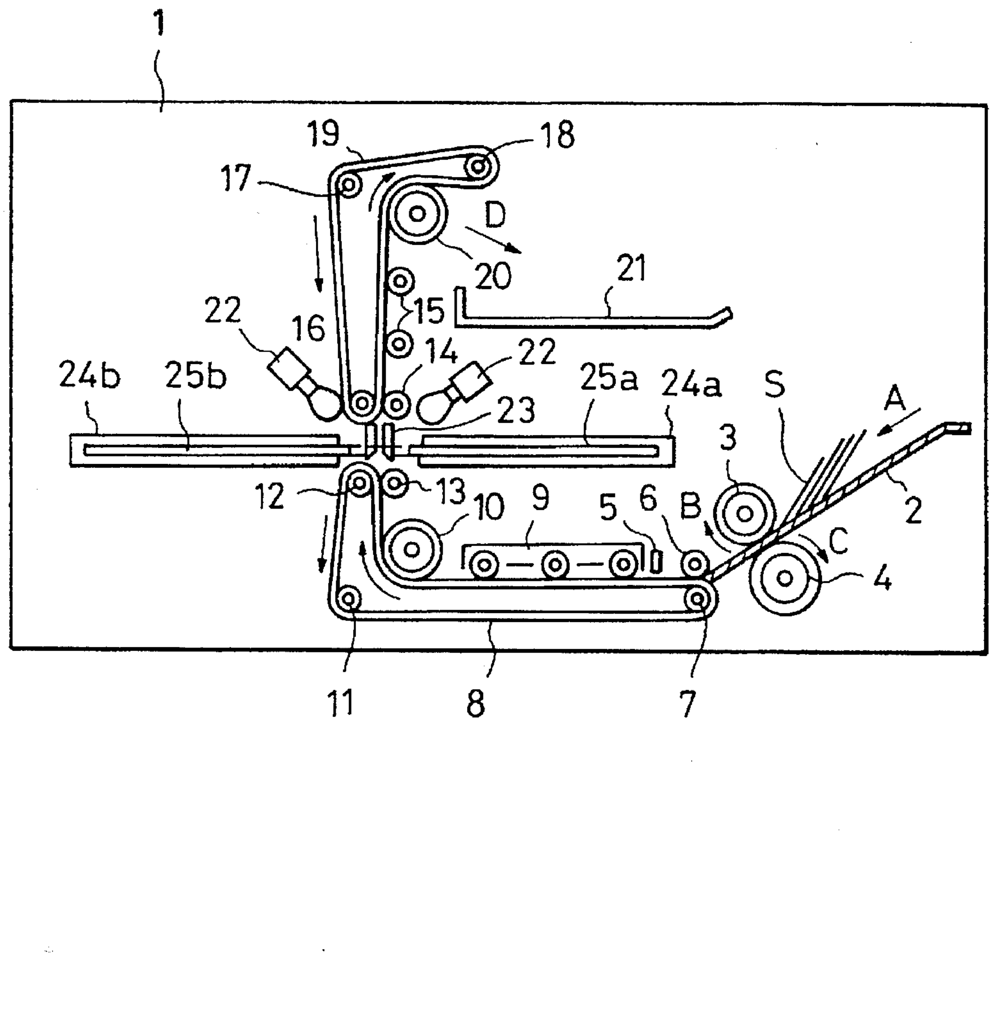
FIG. 1 is a schematic diagram of a subject transport system of an imaging apparatus in accordance with one embodiment of the present invention.

FIG. 1 is a schematic diagram of a subject transport system of an imaging apparatus 1.

Referring to FIG. 1, when a sheet-like subject S is placed on a paper-feed tray 2 inclined downward, the subject S moves in the direction of the arrow A by gravitation. This subject S is separated one by one and transported by means of a paper-feed roller 3 which rotates in the direction of the arrow B and a separation roller 4 which rotates in the direction of the arrow C.

A lower transport belt 8 is supported between belt rollers 7 and 12 and an appropriate tension is maintained by a tension roller 11. The subject S is transported by the rotation of a lower drive roller 10, and the subject S is held pressed against the transport belt 8 by an idle roller 6 and a guide unit 9. A subject detection unit 5 for detecting the subject S which has been transported is disposed between the idle roller 6 and the guide unit 9. The subject detection unit 5 is used to control a shutter 49*a* for film serving as a recording medium shown in FIG. 4 which will be described later.

Next, the subject S transported from a horizontal direction to a vertical direction by the lower transport belt 8 is passed through a pair of guide glasses 23, and both sides of the subject S are simultaneously illuminated by a pair of illuminating lamps 22 when the subject S is passed therethrough. Nip rollers 13 and 14 are disposed above and below the guide glasses 23, respectively.

Further, an upper transport belt 19 is supported between belt rollers 16 and 18 and an appropriate tension is maintained by a tension roller 17. The subject S which is passed through the guide glasses 23 is transported upward by the rotation of an upper drive roller 20, and the subject S is held pressed against the upper transport belt 19 by idle rollers 15.

The subject S changes its transport passage from a vertical direction to a horizontal direction by the upper transport belt 19, and advances in the direction of the arrow D to be ejected onto a paper ejection tray 21.

Figure 3:
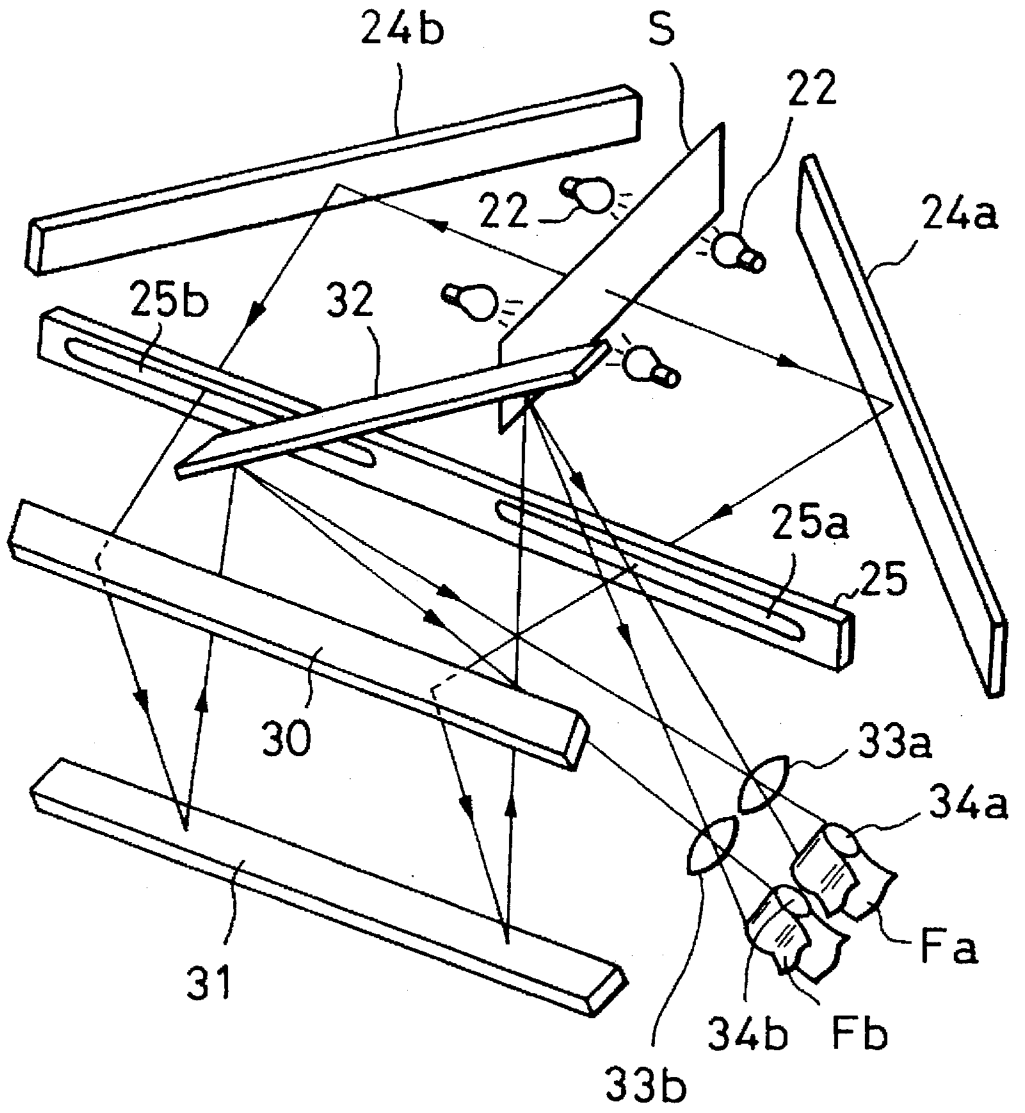
FIG. 3 is a perspective view of mirrors which constitute the optical system of the imaging apparatus in accordance with the present invention.

First mirrors 24*a* and 24*b*, forming an angle of 45° to the left and right, respectively, with respect to the flat surface of the subject S which moves vertically, are disposed in symmetry on both sides of the guide glasses 23 to form an exposure section (see FIG. 3). The first mirrors 24*a* and 24*b* are supported by an internal base structure (not shown) of the imaging apparatus 1 in the same manner as in the roller shaft for transporting the subject S.

Figure 2:
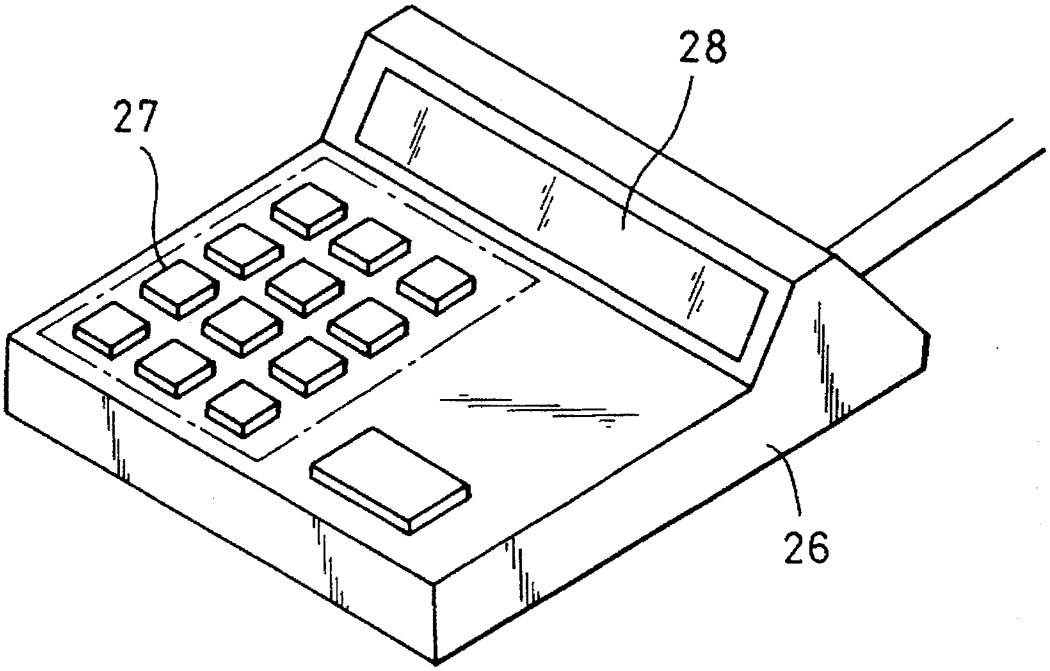
FIG. 2 is a perspective view of a control section for controlling the operation of the imaging apparatus in accordance with the present invention.

FIG. 2 is a perspective view of a control section 26 for controlling the operation of the imaging apparatus 1. Referring to FIG. 2, the control section 26 comprises a keyboard (setting means) 27 and a display 28. The control section 26 is electrically connected to a CPU (not shown) of the imaging apparatus 1 and controls the imaging apparatus 1 via the CPU by the user manipulating the keys of the keyboard 27.

FIG. 3 is a perspective view of mirrors which constitute the optical system of the imaging apparatus 1. In the exposure section of FIG. 3, the images on both sides of the subject S illuminated by the illuminating lamps 22 are reflected by the first mirrors 24*a* and 24*b*, are passed through slits 25*a* and 25*b* of a slit plate 25, respectively, and are reflected obliquely downward by a second mirror 30.

This image is reflected again upward vertically by a third mirror 31, after which it is reflected obliquely downward by a fourth mirror 32. The image reflected by the fourth mirror 32 is passed through projection lenses (photographing means) 33*a* and 33*b* and is projected and formed into an image on films (recording media) Fa and Fb.

Figure 4:
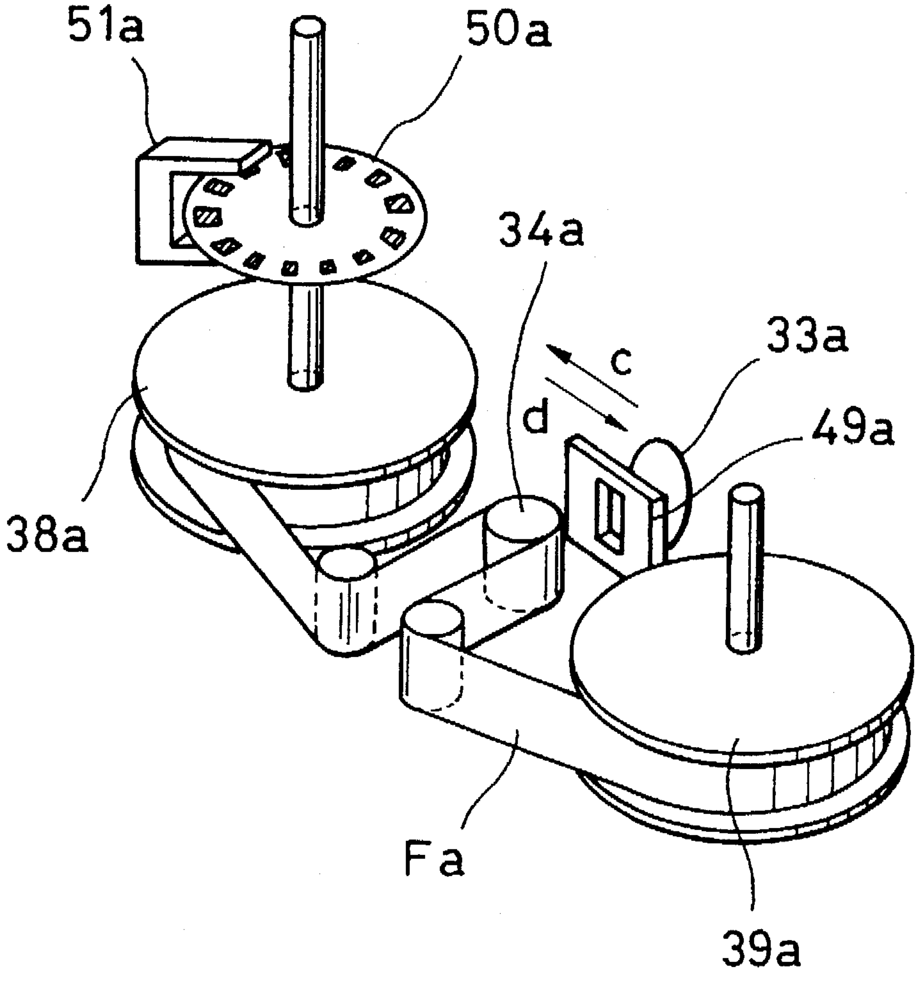
FIG. 4 is a perspective view of a film transport section of the imaging apparatus of the present invention.

FIG. 4 is a perspective view of a film transport section for film Fa. The same construction is provided for film Fb.

In the film transport section, the subject S image formed by the projection lens 33*a* and the shutter 49*a* at the position of a capstan roller 34*a* is exposed on the film Fa fed from a supply reel 38*a* around which an unexposed film is wound, and is taken up by a take-up reel 39*a*. At this time, by checking the signal of an encoder detection unit (measuring means) 51*a* for reading the status of an encoder 50*a* which is axially aligned with the supply reel 38*a*, it is possible to determine whether the film Fa has been transported, and by checking the operation of the encoder per unit time, it is possible to know the remaining amount of the film wound on the film Fa supply reel 38*a*, i.e., the remaining amount of the unexposed film.

The capstan roller 34*a* is connected to a drive motor (not shown). The number of rotations of the capstan roller 34*a* may preferably be set so that when the film Fa is transported at a speed such that the transport speed of the subject S is multiplied by a reduction ratio, the reduction projected image synchronizes with the film Fa.

The shutter 49*a* is connected to a shutter solenoid (not shown). By operating the shutter 49*a* in the direction of the arrow c or d, it is possible to project the subject S image on the film Fa or to shut off the exposure light, respectively.

Figure 5:
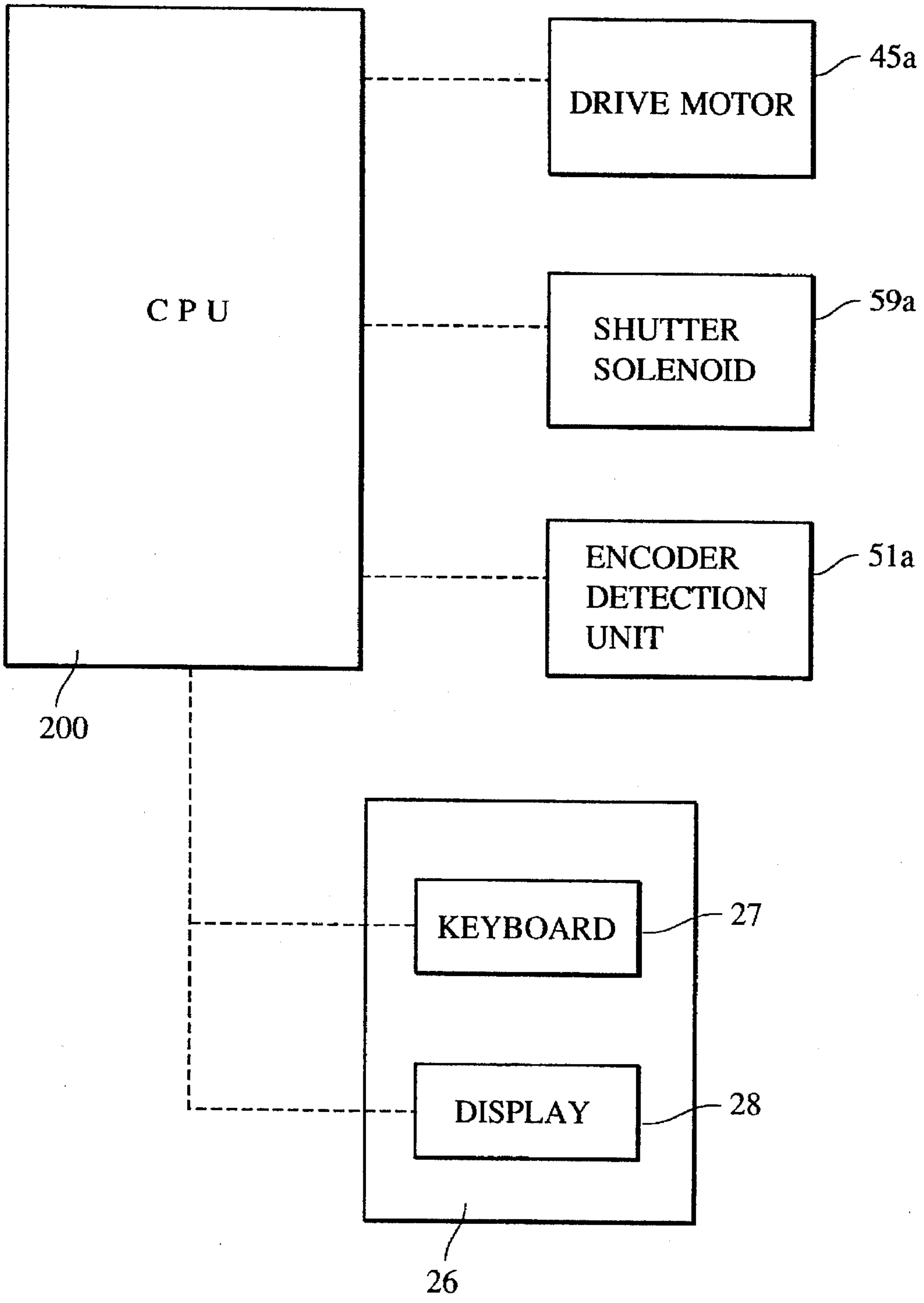
FIG. 5 is a block diagram of a control circuit of the imaging apparatus in accordance with the present invention.

FIG. 5 is a block diagram illustrating a control circuit for the photographing operation for the film Fa of a rotary camera of the present invention. The same construction is provided for the film Fb.

Figure 11:
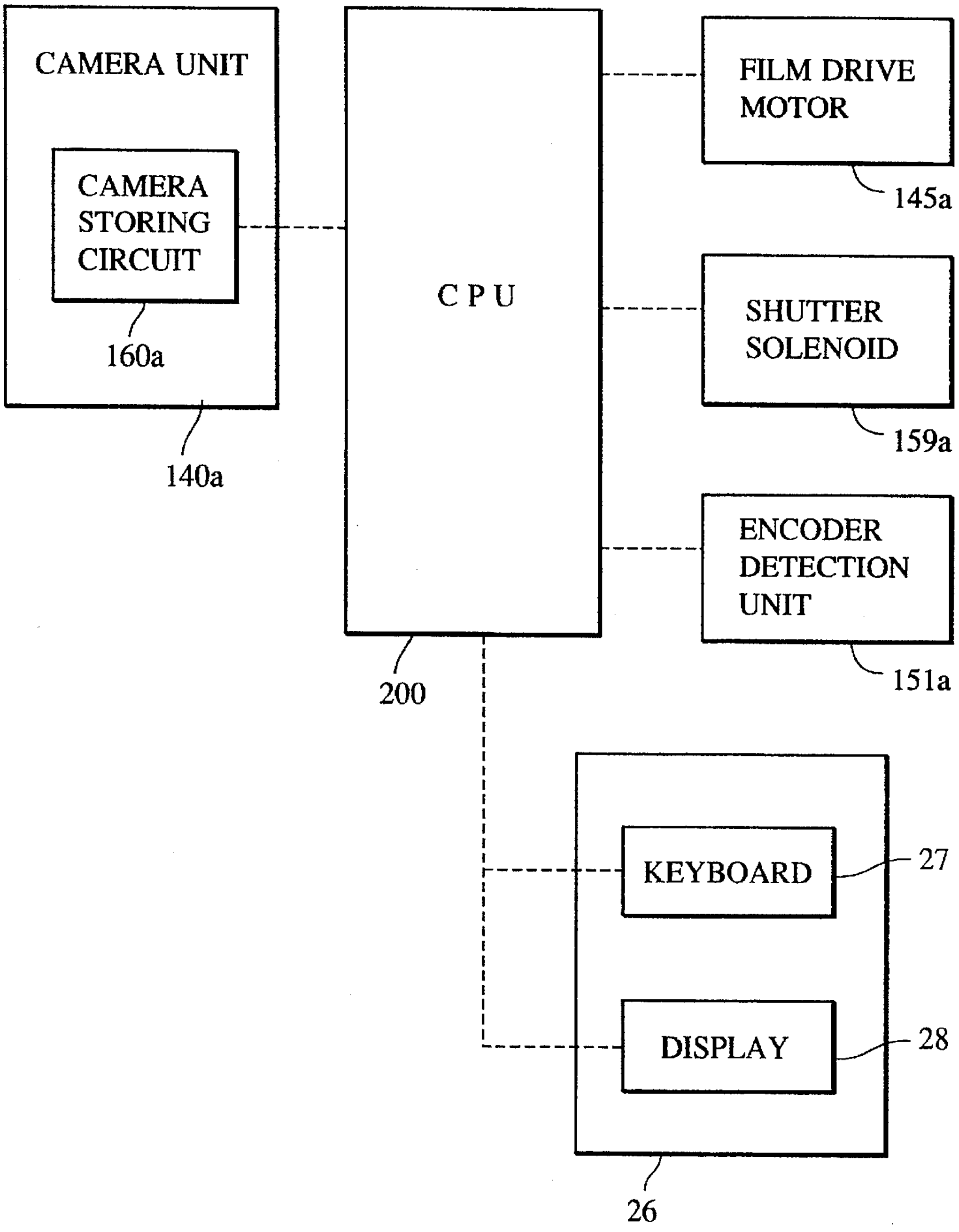
FIG. 11 is a block diagram of a control circuit of the imaging apparatus in accordance with the present invention.

Each of the elements shown in block outline in FIG. 5, as well as in FIG. 11, is well known per se, and a specific type of construction is not critical to carry out the invention or to a disclosure of the best mode for carrying out the invention.

A CPU 200 is connected to each of a drive motor 45*a* for transporting a film, a shutter solenoid 59*a* for opening and closing the shutter 49*a*, an encoder detection unit (measuring means) 51*a* for monitoring the rotation operation of the supply reel 38*a*, the keyboard 27, and the display 28.

Figure 6:
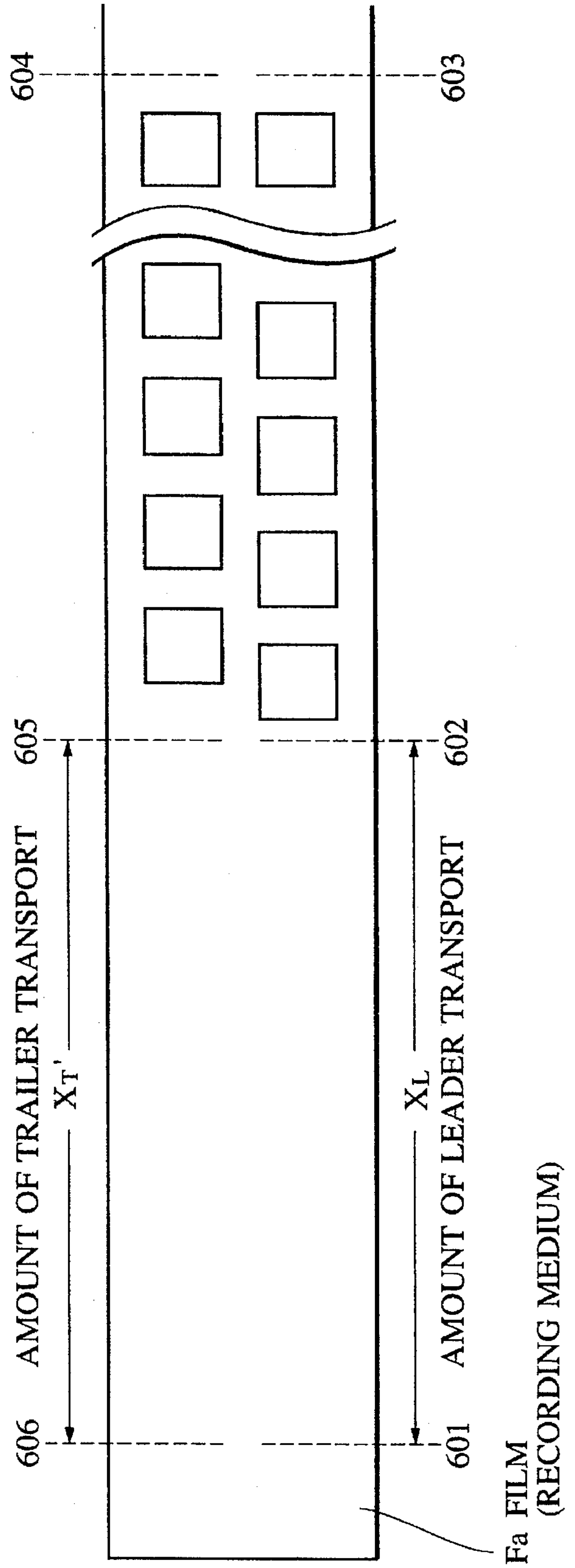
FIG. 6 is a view of a film used in the imaging apparatus of the present invention.

FIG. 6 is a view of a film illustrating the operation in accordance with a first embodiment of the present invention.

Referring to the film Fa of FIG. 6, the film Fa is inserted into the imaging apparatus 1, and the leader of the film Fa is transported by the amount $X_L$ of the leader transport from a point 601. That is, no photographing is performed from the point 601 to point 602, and after the film is transported, forward photographing of the forward/reverse photographing is performed on the lower step (the first row) of the film point 602. After the forward photographing is performed up to a point 603, the film Fa is reversed (the film is turned upside down), and reverse photographing is performed on the upper step (the second row) of the film from a point 604. The remaining amount of the film is checked by the encoder detection unit 51*a* during the reverse photographing, and a point 605 of the position where the trailer transport starts is determined on the basis of the amount $X_L$ of the leader transport, the point 605 being such that when the trailer transport terminates, a point 606 is reached. Photographing is performed up to the point 605, and photographing is prohibited from the point 605.

That is, the trailer is transported by the amount $X_L$ of the leader transport without performing photographing from the point 605, and the trailer transport is stopped at a point 606. When such an operation is performed, on the film Fa, the amount $X_T'(X_T'=X_L)$ of the trailer transport, the point 606 where the trailer transport terminates, and the point 605 where the trailer transport starts overlap the amount $X_L$ of the leader transport, the point 601 where the leader transport starts, and the point 602 where the leader transport terminates. Thus, the film transport for the purpose of preventing reexposure can be performed.

Figure 7:
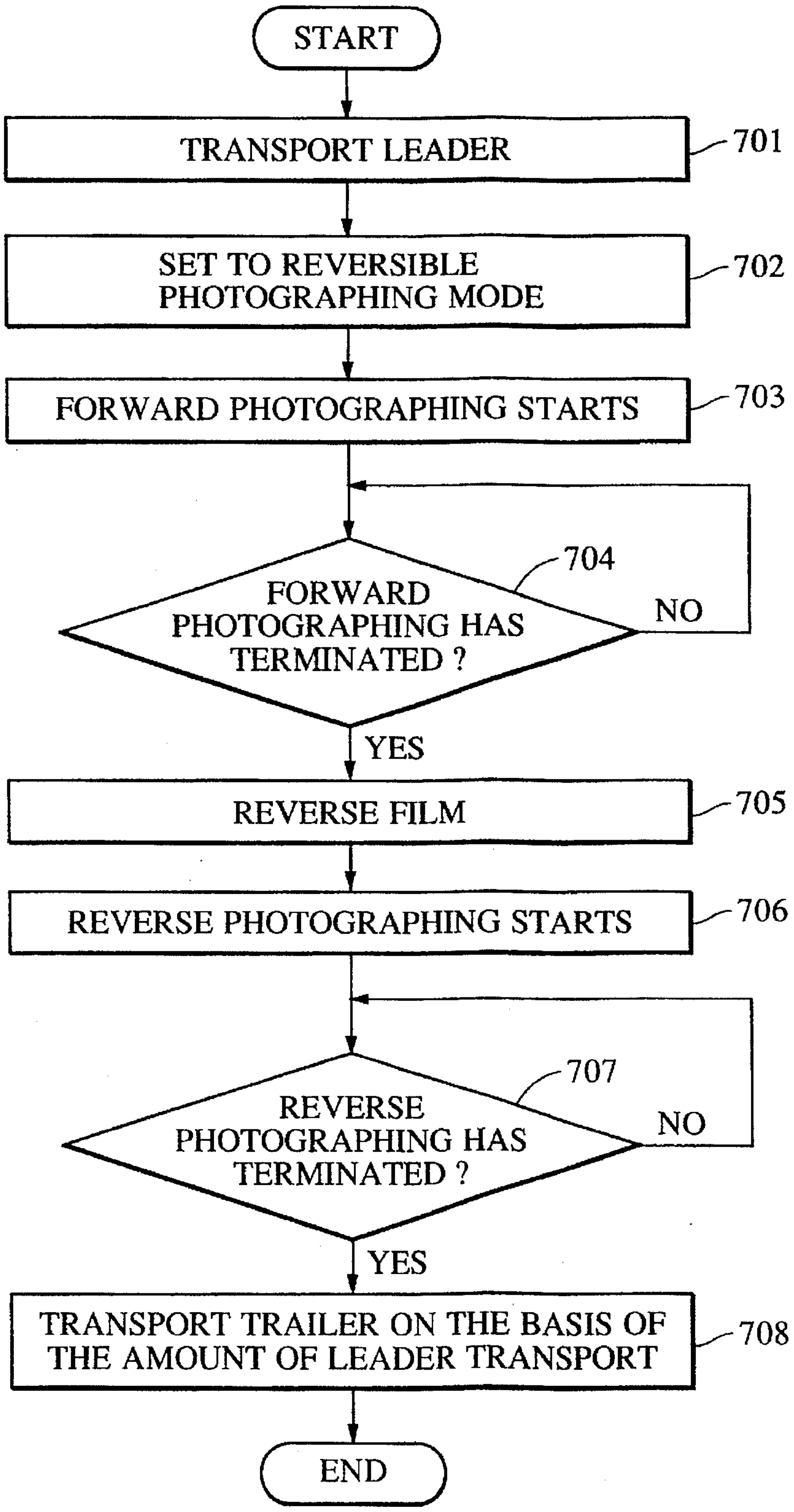
FIG. 7 is a flowchart of a first embodiment of the imaging apparatus in accordance with the present invention.

The operation of the first embodiment of the present invention will be described below with reference to the flowchart of FIG. 7.

First, the user inserts a film into the imaging apparatus 1, and the leader of the film is transported (step 701). Then, the photographing mode is set to a forward/reverse photographing (step 702), and forward photographing of the forward/reverse photographing is started (step 703). To know whether the forward photographing should terminate because the trailing end of the film is reached, the remaining amount of the film is checked (step 704). If the forward photographing has terminated, the film is reversed and inserted (step 705), and reverse photographing is started (step 706). Also during the reverse photographing, the remaining amount of the film such that the amount of transport for transporting the trailer, set on the basis of the amount $X_L$ of the leader transport from the front end of the film, is taken into account, is checked (step 707). If the reverse photographing has terminated, the trailer transport for the same amount $X_L$ of the leader transport is performed (step 708).

If the user is going to perform forward/reverse photographing in a case where the amount of the leader transport is set at an amount of transport different from the trailer transport, the fact that the amounts of the transports are different may be displayed on the display 28 in order to warn the user.

In an imaging apparatus capable of setting the amounts of the leader transport and trailer transport, the setting of the amounts of the leader transport and trailer transport is prohibited during the forward/reverse photographing. When the user gives an instruction to change the setting of the amounts of the leader transport and trailer transport, a warning for the user may be displayed on the display 28.

In an imaging apparatus capable of setting the amounts of the leader transport and trailer transport, when the amount of the transport is changed in the middle of the forward/reverse photographing, the amount of the transport when the leader is transported is memorized. The trailer may be transported on the basis of the amount of the transport, and the operation described in this embodiment may be performed on the basis of the memorized amount of the transport.

In a case where the above-described operation is performed and the amounts of the leader transport and trailer transport become smaller than the reference values, a warning may be displayed after the trailer transport has terminated to prevent the subject image from being made foggy due to external light on the film when the film is taken out as during normal use.

[Second Embodiment]

Figure 8:
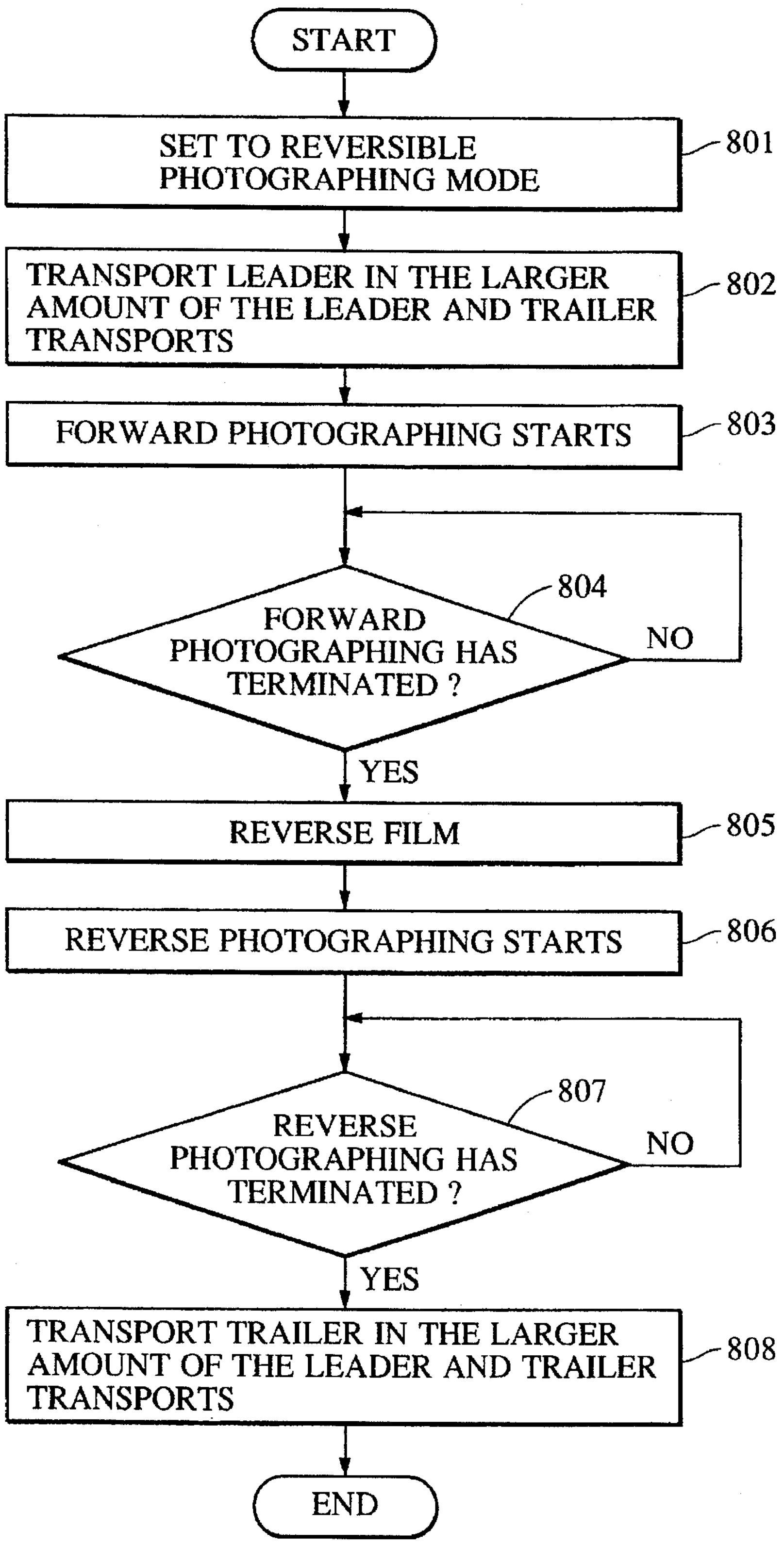
FIG. 8 is a flowchart of a second embodiment of the imaging apparatus in accordance with the present invention.

A second embodiment of the present invention will be described below with reference to FIG. 8.

Although in the first embodiment of the present invention an operation for making the amount of the trailer transport is made to coincide with the amount of the leader transport is performed, in the second embodiment of the present invention, the following operations are performed by taking into consideration the mounting and dismounting environment and conditions before and after the photographing operation when forward/reverse photographing is known to be performed before the leader transport is performed.

In this embodiment, a description will be given of the operation in which priority is given to reexposure prevention, and the leader transport and the trailer transport are performed in the larger amount of the amounts of the leader transport and trailer transport.

The operation of the second embodiment of the present invention will be described below with reference to the flowchart of FIG. 8.

First, the user inserts a film into the imaging apparatus 1, and the photographing mode is set to forward/reverse photographing (step 801). Thereafter, the leader of the film is transported by the larger amount of the leader transport and trailer transport by taking into consideration the reexposure prevention (step 802), and forward photographing of the forward/reverse photographing is started (step 803). The remaining amount of the film is checked to determine when the end of the film is reached during the forward photographing, and the forward photographing terminates (step 804). When the forward photographing terminates, the film is reversed and inserted (step 805), and reverse photographing is started (step 806). During the reverse photographing, similarly, the remaining amount of the film is checked such that the amount for transporting the trailer by the longer of the leader and trailer lengths from the end of the film is taken into account (step 807). When the reverse photographing terminates, the trailer is transported on the basis of the larger amount (step 808).

The leader and trailer may be transported in the smaller amount of the amounts of the leader transport and trailer transport by giving priority to using as much film as possible. Also, the leader and trailer may be transported in accordance with either the amount of the leader transport or the trailer transport.

A selection of whether the user transports the film in the larger amount by giving priority to the reexposure or in the smaller amount by giving priority to not wasting the film, or whether the film should be transported in accordance with the amount of the leader transport or trailer transport may be made by using the keyboard 27. When the amount of the transport is changed as described above, this fact may be displayed on the display 28 in order to notify the user.

In the same way as in the first embodiment, if the user is going to perform forward/reverse photographing when the amounts of the leader transport and trailer transport are set at a different amount, a warning may be displayed on the display 28 for the user about the fact that the amount of the transport is different.

In the same way as in the first embodiment, in an imaging apparatus capable of setting the amounts of the leader transport and trailer transport, the setting of the amounts of the leader transport and trailer transport is prohibited in the process of the forward/reverse photographing. If the user gives an instruction to change the setting of the amounts of the leader transport and trailer transport, a warning display for the user may be made on the display 28.

In the same way as in the first embodiment, in an imaging apparatus capable of setting the amounts of the leader transport and trailer transport, the amount of the transport when the leader is transported in a case where the amount of the transport is changed in the middle of the forward/reverse photographing may be memorized so that the trailer is transported in the amount of the transport, and the operations described in this embodiment may be performed on the basis of the memorized amount of the transport.

In the same way as in the first embodiment, in a case where the above-described operations are performed and the amounts of the leader transport and trailer transport become smaller than the reference values, a warning display may be made after the trailer transport has terminated to prevent the subject from being photographed in the foggy portion of the film when the film is taken out as during normal use.

[Third Embodiment]

A third embodiment of the present invention will be described below with reference to FIGS. 9 to 12.

Figure 9:
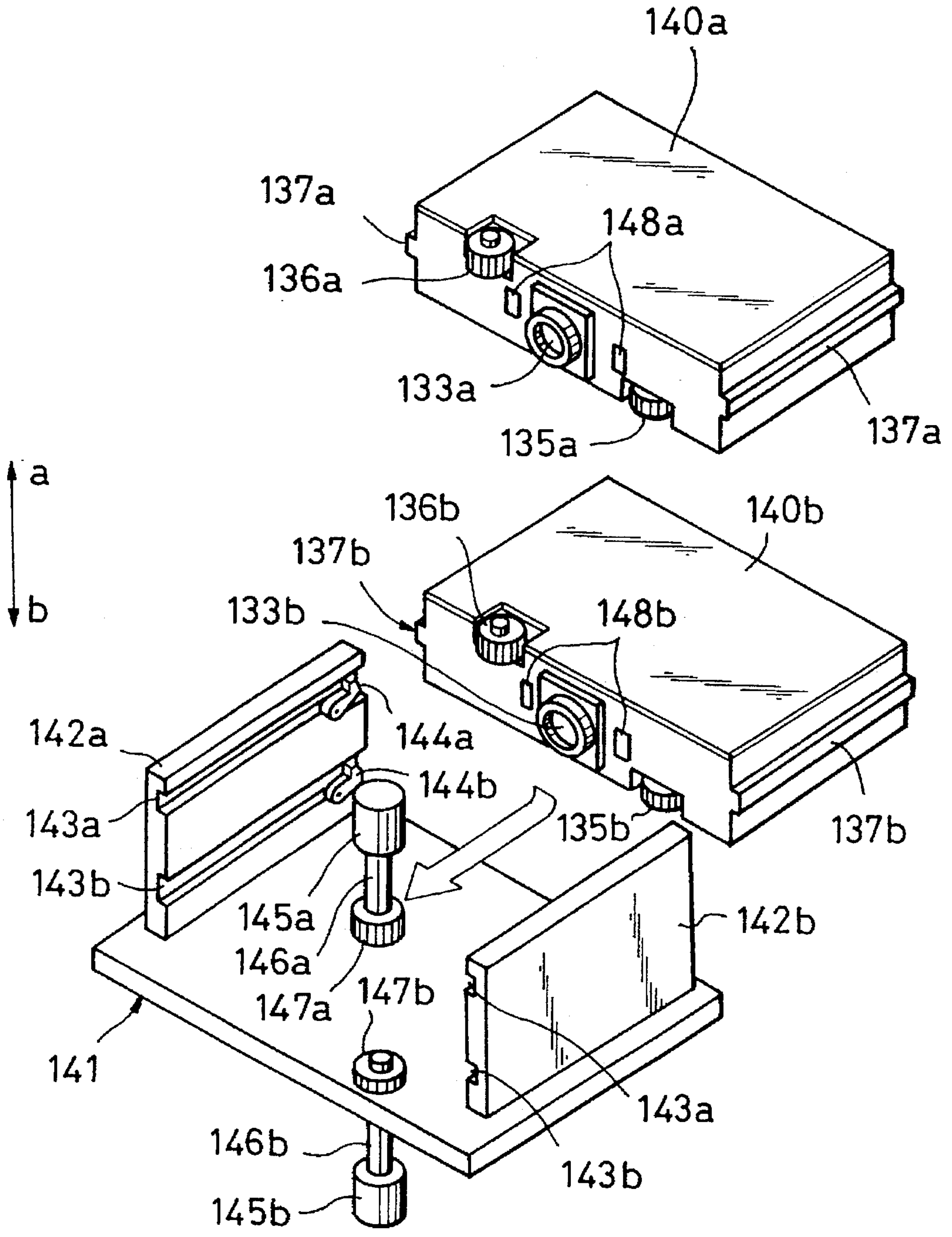
FIG. 9 is a perspective view of a camera unit, which is recording means used in the imaging apparatus in accordance with the present invention, and a drive system therefor.

FIG. 9 is a perspective view of camera units (film storage case) 140*a* and 140*b*, which are recording means mountable and dismountable from the main body of the imaging apparatus, and the drive system therefor.

Referring to FIG. 9, the camera units 140*a* and 140*b* have projection lenses (photographing means) 133*a* and 133*b*, connection gears 135*a* and 136*a*, and 135*b* and 136*b*, and a pair of positioning ribs 137*a* and 137*b*, respectively. The positioning ribs 137*a* and 137*b* are inserted into a pair of guide grooves 143*a* and 143*b* formed on camera guides 142*a* and 142*b* which are secured to a camera chassis 141, and the camera units 140*a* and 140*b* are fixed by camera lock claws 144*a* and 144*b*, respectively.

The connection gears 135*a* and 135*b* of the fixed camera units 140*a* and 140*b* are connected to drive gears 147*a* and 147*b* and drive motors 145*a* and 145*b* via rotation shafts 146*a* and 146*b*, respectively. Motor 145*a*, rotation shaft 146 and drive gear 147*a* are supported in a top portion of the camera chassis, which is not shown in FIG. 9. By operating the drive motors 145*a* and 145*b*, the films Fa and Fb set inside the camera units 140*a* and 140*b* can be transported.

When the camera units 140*a* and 140*b* are set in the camera chassis (the main body of the imaging apparatus) 141, connector sections 148*a* and 148*b* can be connected to the connector portion of the main body (not shown) side to make an electrical connection.

The camera units 140*a* and 140*b* can also be reversed, i.e., flipped over, in the direction of the arrows a and b shown in FIG. 9 and inserted into the camera chassis 141. In this way, the camera units 140*a* and 140*b* can be inserted into the camera chassis 141 in a way to position both the first and second rows of the film for photographing. When each camera unit is inserted so as to face the front side, forward photographing is performed, and when it is inserted so as to face the reverse side, reverse photographing is performed.

More specifically, when the camera units are inserted reversed in the direction of the arrows a and b, in the same manner as that described above, the connection gears 136*a* and 136*b* of the camera units 140*a* and 140*b* are connected to the drive gears 147*a* and 147*b* secured to the rotation shafts 146*a* and 146*b* via the drive motors 145*a* and 145*b* and the rotation shafts 146*a* and 146*b*, respectively. Thus, by operating the drive motors 145*a* and 145*b*, the films Fa and Fb set inside the camera units 140*a* and 140*b* can be transported.

When the camera units 140*a* and 140*b* are reversed and inserted in the direction of the arrows a and b shown in FIG. 9, the films Fa and Fb inside the camera units 140*a* and 140*b* are transported in a direction opposite to that of FIG. 9.

Figure 10A:
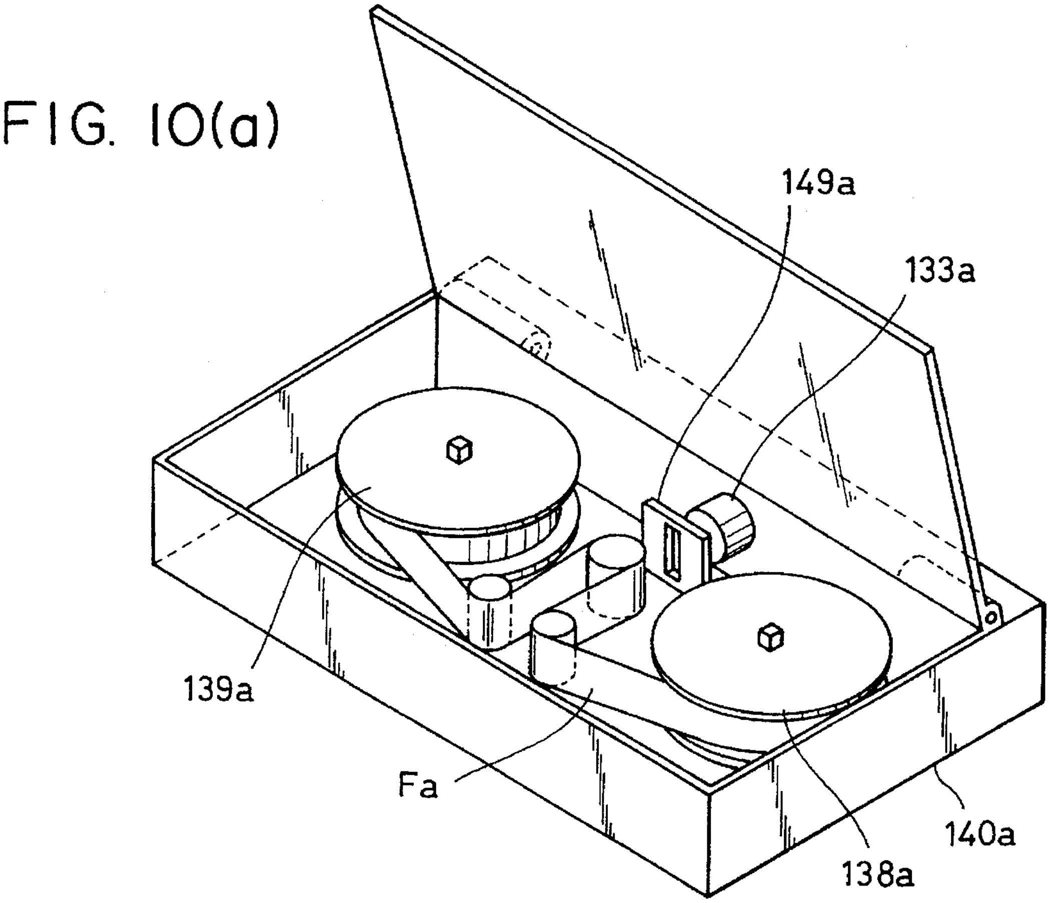
FIGS. 10(*a*) and 10 (*b*) are respectively a perspective view of the interior of a camera unit and a schematic diagram of the camera unit used in the imaging apparatus in accordance with the present invention.
Figure 10B:
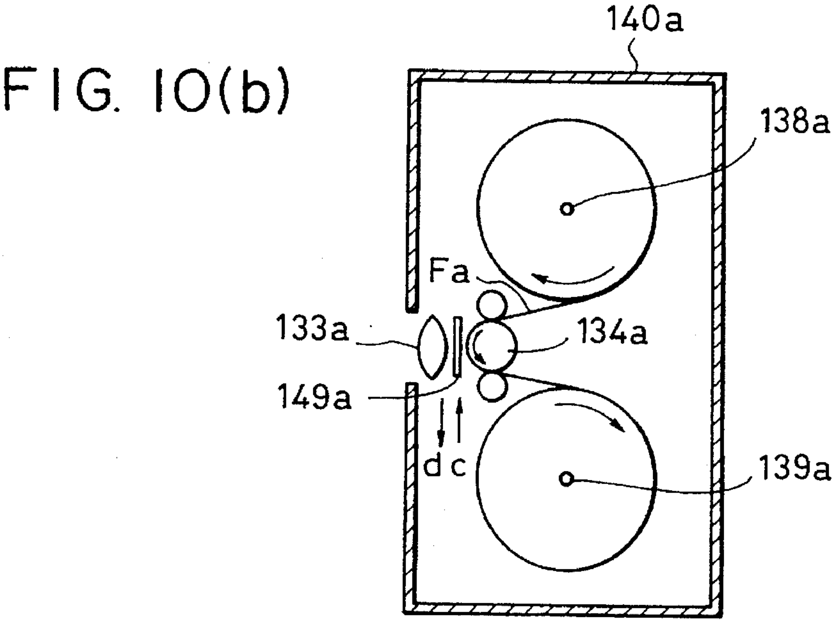

FIG. 10(*a*) is a perspective view of the interior of the camera unit 140*a*. FIG. 10(*b*) is a schematic illustration of the camera unit 140*a*. The same construction is provided for the camera unit 140*b*.

The camera unit 140*a*, as described above, has a projection lens (photographing means) 133*a*, and a capstan roller 134*a*. The film Fa fed from the supply reel 138*a* around which an unexposed film is wound is exposed for a subject image formed by the projection lens 133*a* and the shutter 149*a* at the position of the capstan roller 134*a*, and is taken up by the take-up reel 139*a*.

The capstan roller 134*a* is connected to the drive motor 145*a* shown in FIG. 9. The number of rotations of the capstan roller 134*a* may preferably be set in such a way that when the film Fa is transported at a speed such that when the transport speed of the subject S is multiplied by the reduction ratio, the reduction projected image synchronizes with the film Fa.

Transport speed is reduced in accordance with each reduction ratio by gears (not shown) between the connection gears 135*a* and 135*b* and the capstan rollers 134*a* and 134*b* of the camera units 140*a* and 140*b*, and the drive motors 145*a* and 145*b* are rotated at a constant speed in proportion to the subject S transport speed regardless of the reduction ratio of the camera units 140*a* and 140*b*. In this way, the film Fa may be transported at a speed in proportion to the reduction ratio of the camera unit 140*a*.

The shutter 149*a* is connected to a solenoid (not shown). When the shutter 149*a* is operated in the direction of the arrow c or d, it is possible to project the subject S image on the film Fa or to shut off light exposure thereto, respectively.

FIG. 11 is a block diagram illustrating a control circuit for a photographing operation on the film Fa of the rotary camera of the present invention. The same construction is provided for the film Fb.

A CPU 200 is connected to each of a drive motor 145a for transporting the film Fa, a shutter solenoid 159a for opening and closing the shutter 149a, an encoder detection unit (measuring means) 151a for monitoring the rotation operation of the supply reel 138a, a storing circuit (storing section) 160a inside the camera unit 140a, the keyboard 27 of the control section 26, and the display 28.

In the third embodiment of the present invention, the operation described in the first and second embodiments of the present invention can be performed also by inserting a camera unit in another imaging apparatus in the middle of photographing in an imaging apparatus from which a camera unit can be mounted and dismounted.

In the film Fa of FIG. 6, when the film Fa is inserted into the imaging apparatus and the leader is transported for the amount $X_L$ of the leader transport from the point 601 to the point 602, data for the amount $X_L$ of the leader transport is stored in the storing circuit 160a inside the camera unit 140a. Thereafter, forward photographing is performed until the point 603 is reached, after which the film is reversed, and reverse photographing is performed from the point 604 to the point 605. Even if the camera unit 140a is dismounted from the camera unit 140a and inserted into the main body during this period, and photographing is performed, the amount $X_L$ of the leader transport, stored in the storing circuit 160a inside the camera unit 140a, is extracted, and the trailer is transported for the amount $X_L$ of the leader transport. In this way, the point 606 is the same as the point 601 reached on the film. Thus, the same operation as in the first embodiment can be performed.

Figure 12:
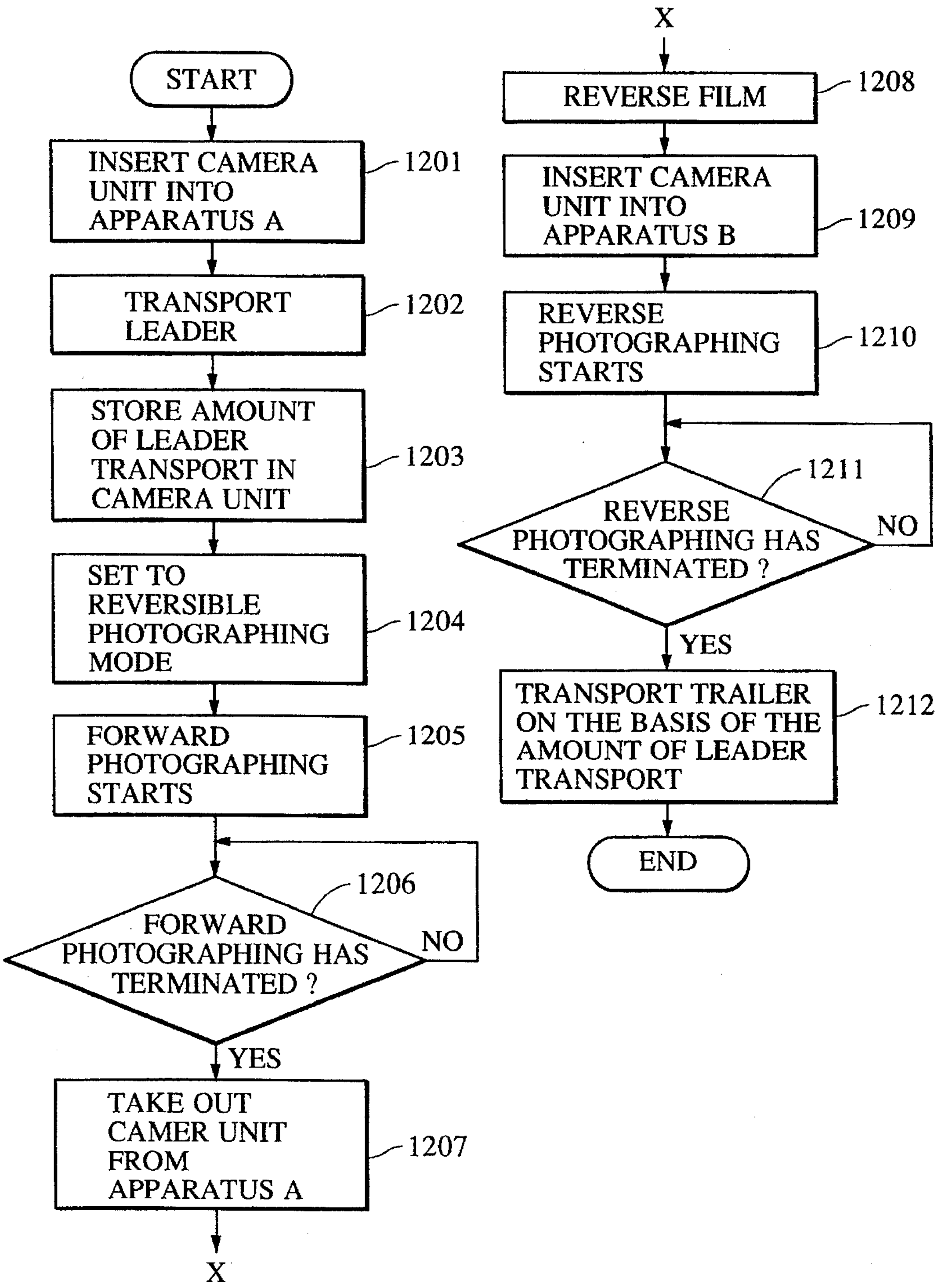
FIG. 12 is a flowchart of a third embodiment of the imaging apparatus in accordance with the present invention.
Figure 13:
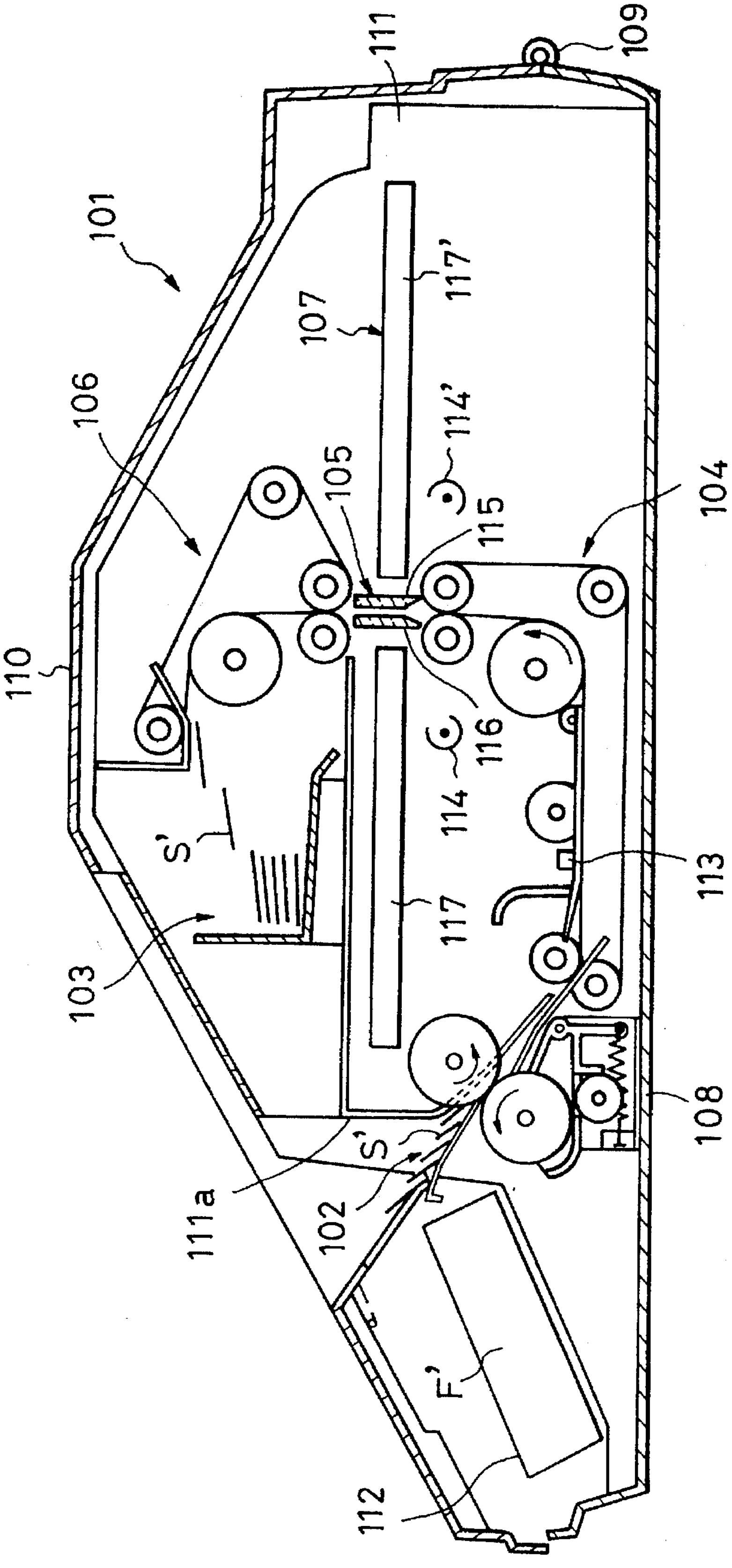
FIG. 13 is a schematic sectional view of a conventional imaging apparatus.
Figure 14:
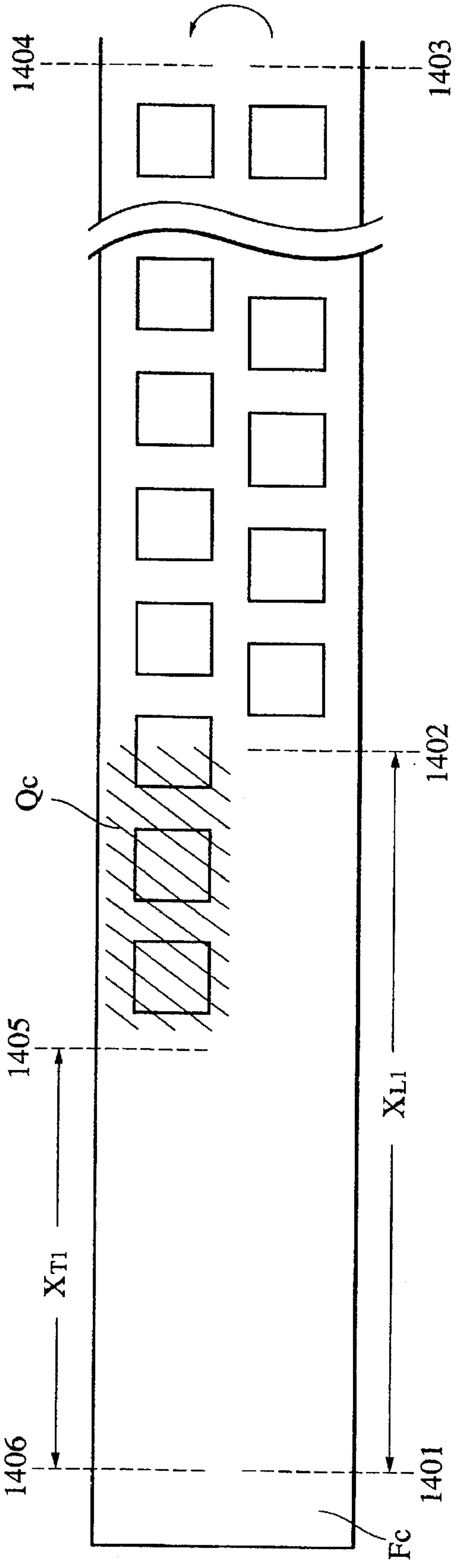
FIG. 14 is a view of a film used in the conventional imaging apparatus.
Figure 15:
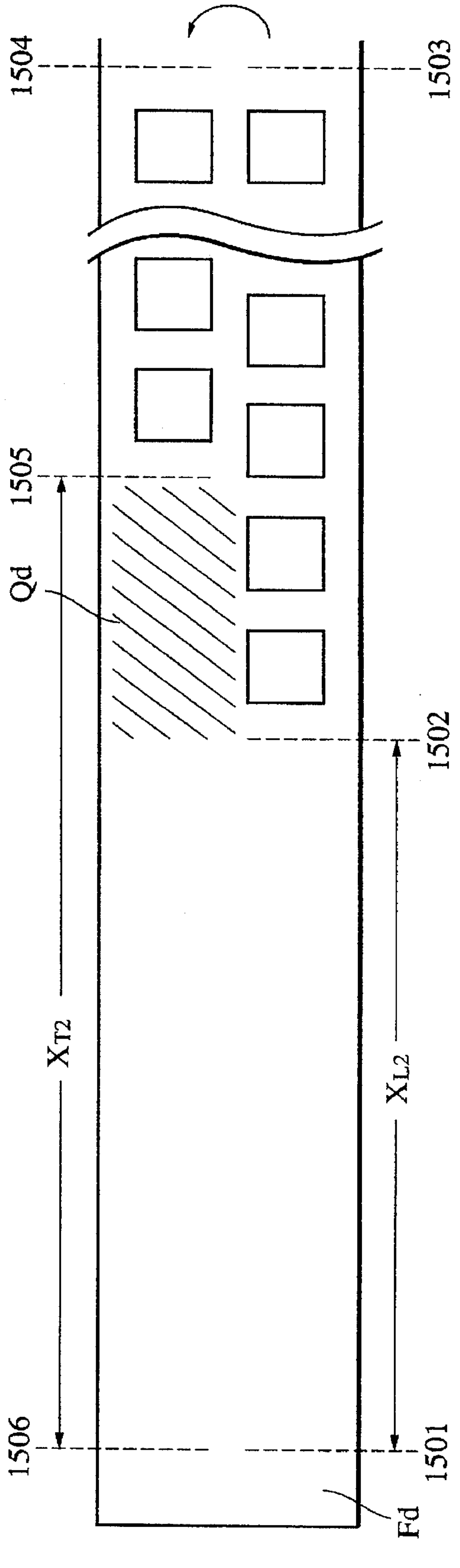
FIG. 15 is a view of the film used in the conventional imaging apparatus.

The operation of the third embodiment of the present invention will be described below with reference to the flowchart of FIG. 12.

A description will be given by using the following case as an example. Initially, when two imaging apparatuses 1A and 1B are present, the camera unit 140a is first inserted into the imaging apparatus 1A, forward photographing of the forward/reverse photographing is performed. When the forward photographing terminates, in order for the user of another camera unit to use the imaging apparatus 1A, the camera unit 140a is taken out from the imaging apparatus 1A, and the camera unit 140a is inserted into the imaging apparatus 1B, and reverse photographing is performed.

The user inserts a film into the camera unit and inserts the camera unit into the imaging apparatus 1A (step 1201), and the leader of the film is transported (step 1202). When the transport of the leader terminates, data for the amount $X_L$ of the leader transport is stored in the storing circuit of the camera unit (step 1203). Thereafter, the photographing mode is set to forward/reverse photographing (step 1204), and forward photographing of the forward/reverse photographing is started (step 1205). The remaining amount of the film is checked to determine when the end of the film is reached during the forward photographing and the forward photographing has terminated (step 1206). When the forward photographing terminates, the camera unit is taken out from the imaging apparatus 1A (step 1207). At this point, the film is reversed (step 1208), the camera unit is inserted into the imaging apparatus 1B (step 1209), and the reverse photographing is started (step 1210). During the reverse photographing also, the remaining amount of the film is checked such that the amount for performing the trailer transport in the amount $X_L$ of the leader transport stored in the camera unit is taken into account (step 1211). When the reverse photographing terminates, the trailer is transported in the amount $X_L$ of the leader transport stored in the camera unit (step 1212).

Although the timing at which the amount of the leader transport is recorded in the camera unit is after the leader transport in the flowchart, the timing may be at any time from when the camera unit is inserted until it is taken out. Also, the timing at which the amount of the leader transport is referred to from the camera unit may be, similarly to that described above, at any time from when the camera unit is inserted until the trailer is transported. Also, the timing at which the camera unit is taken out from the imaging apparatus 1A and is inserted into the imaging apparatus 1B may be such that, similarly to that described above, the forward photographing or the reverse photographing is interrupted in the middle, and the forward photographing or the reverse photographing may be continued in the imaging apparatus 1B.

Although in the third embodiment the same operation as in the first embodiment is described, the operation described in the second embodiment may be performed in a similar manner.

In the same way as in the first and second embodiments, if the user is going to perform forward/reverse photographing when the amounts of the leader transport and trailer transport are set at a different amount, a warning about the fact that the amounts of the transports are different may be displayed on the display 28.

In the same way as in the first and second embodiments, in an imaging apparatus capable of setting the amounts of the leader transport and trailer transport, the setting of the amounts of the leader transport and trailer transport may be prohibited in the middle of the forward/reverse photographing. If the user gives an instruction to change the setting of the amounts of the leader transport and trailer transport, a warning display for the user may be made on the display 28.

In the same way as in the first and second embodiments, when the above-described operation is performed and the amounts of the leader transport and trailer transport become smaller than the reference values, a warning may be displayed after the trailer transport has terminated to prevent the subject image from being made foggy when the film is taken out as during normal use.

In an imaging apparatus capable of setting the amounts of the leader transport and trailer transport, data for the amount of the leader transport when the amount of the transport is changed in the middle of the forward/reverse photographing is memorized in a storing circuit inside the camera unit. The trailer of the film is transported on the basis of the amount of leader transport, and the operation described in this embodiment may be performed on the basis of the memorized amount of the transport.

The present invention is constructed as described above and has the above-described effect. When forward/reverse photographing is performed, the amounts of the leader transport and trailer transport are made to coincide with predetermined set values, and the leader and trailer of the film are transported. In this way, the use portions of the recording medium coincide with each other for the forward and reverse photographing. Thus, it is possible to prevent reexposure of the recording medium, and to prevent the recording medium from being wasted.

When forward/reverse photographing is to be performed, the trailer is transported by making the amount of trailer transport coincide with a predetermined set value; when forward/reverse photographing is to be performed because the transporting mode is set to forward/reverse photographing after the leader is transported, the trailer is transported on the basis of the amount of the leader transport; when forward/reverse photographing is to be performed because the transporting mode is set to forward/reverse photographing before the leader is transported, the leader and the trailer are transported by the larger or smaller of the leader transport and the trailer transport; or the user is able to select any desired smaller or larger amount of the amounts of the leader transport and trailer transport. Thus, it is possible to make the use portions of the recording medium easily coincide with each other, to prevent reexposure of the recording medium, and to prevent the recording medium from being wasted.

Since a warning display is made if the amounts of the leader transport and trailer transport are different in a case where forward/reverse photographing is performed, a warning about the reexposure of the recording medium and the wasteful use of the recording medium may be given to the user.

Since forward/reverse photographing is prohibited if the amounts of the leader transport and trailer transport are different in a case where forward/reverse photographing is performed, it is possible to prevent reexposure of the recording medium, and to prevent the recording medium from being wasted.

If the amount of the transport is below a fixed value when the leader and trailer of film are transported when forward/reverse photographing is performed, a warning about the reexposure of the recording medium may be given by giving a warning when the trailer transport terminates.

In an imaging apparatus in which a plurality of camera units having a recording medium in a roll form loaded therein can be mounted and dismounted, the camera units have a storing section, and data for the amounts of the leader transport and trailer transport is stored in the storing section of the camera unit. Thus, even when a camera unit is inserted into another imaging apparatus, the same operation as that described above can be performed.

Many different embodiments of the present invention may be constructed without departing from the spirit and scope of the present invention. It should be understood that the present invention is not limited to the specific embodiments described in this specification. To the contrary, the present invention is intended to cover various modifications and equivalent arrangements included within the spirit and scope of the invention as hereafter claimed. The scope of the following claims is to be accorded the broadest interpretation so as to encompass all such modifications, equivalent structures and functions.

What is claimed is:

1. An imaging apparatus for forwardly and reversely photographing images on two rows of a recording medium, said apparatus comprising:

- imaging means for recording an image onto the recording medium;
- transport means for forwardly and reversely transporting the recording medium between a supply section and a take-up section;
- first setting means for setting the amount of leader transport on the first row of the recording medium to a first value;
- second setting means for setting the amount of trailer transport on the second row of the recording medium to a second value on the basis of the amount of the leader transport set by said first setting means; and
- transport control means for controlling the amounts of the leader transport and trailer transport of the recording medium on the basis of the values set by said first and second setting means.

2. An imaging apparatus according to claim 1, wherein said first and second setting means set the amount of the trailer transport to be equal to the amount of the leader transport.

3. An imaging apparatus according to claim 1, wherein said first setting means can set the amount of the leader transport at any desired value.

4. An imaging apparatus according to claim 1, wherein said imaging means comprises a camera unit containing said supply section, said take-up section and said transport means, and a main unit for housing said camera unit, wherein said camera unit can be mounted and dismounted from said main unit.

5. An imaging apparatus according to claim 4, further comprising a reel, around which a recording medium is wound, removably mounted in said supply section.

6. An imaging apparatus according to claim 4, wherein said main unit includes optical means for projecting an image on a recording medium.

7. An imaging apparatus according to claim 6, wherein said camera unit includes a projection lens.

8. An imaging apparatus according to claim 4, wherein said camera unit includes a case for storing a supply reel and a take-up reel.

9. An imaging apparatus according to claim 4, wherein said camera unit includes means for storing the amount of the leader transport set by said first setting means.

10. An imaging apparatus according to claim 9, wherein said storing means stores the amount of the trailer transport set by said second setting means.

11. An imaging apparatus according to claim 4, wherein a plurality of camera units can be mounted in said main unit.

12. An imaging apparatus for forwardly and reversely photographing images on two rows of a recording medium, said apparatus comprising:

- imaging means for recording an image on the recording medium;
- leader transport means for transporting a leader of the recording medium on the first row at which forward photographing is performed;
- trailer transport means for transporting a trailer of the recording medium on the second row at which reverse photographing is performed;
- first setting means for setting the amount of the leader of the recording medium; and
- second setting means for setting the amount of the trailer of the recording medium on the basis of the amount of the leader transport set by said first setting means.

13. An imaging apparatus according to claim 12, further comprising measuring means for measuring a length of the recording medium, said trailer transport means being operated to start the trailer transport when the amount of the recording medium on the second row of the film set by said measuring means reaches the amount of the trailer transport set by said second setting means.

14. An imaging apparatus according to claim 12, further comprising document transport means for transporting a sheet-like original document, the image of the original document being photographed while the original document and the recording medium are being transported.

15. An imaging apparatus according to claim 12, further comprising a film storage case for storing a supply reel and a take-up reel, and a main unit for housing said film storage case, wherein said film storage case can be mounted and dismounted from said main unit.

16. An imaging apparatus according to claim 15, wherein said main unit of the apparatus comprises an optical system for projecting an image on film inside said film storage case.

17. An imaging apparatus according to claim 16, wherein said film storage case comprises a projection lens.

18. An imaging apparatus according to claim 16, wherein said film storage case is mounted in said main unit of the apparatus in such a manner as to face a front side and a reverse side.

19. An imaging apparatus according to claim 12, wherein the amount of the trailer transport is set to be the same amount as that of the leader transport, and both ends of the leader transport area on the first row of the recording medium and the trailer transport area on the second row coincide with each other on the recording medium.

20. A method for operating an imaging apparatus for forwardly and reversely photographing images onto two rows of a recording medium, said method comprising the steps of:

supporting the recording medium between a supply section and a take-up section for movement in a forward direction and in a reverse direction;

setting the amount of leader transport on the first row of the recording medium to a first set value;

recording images of an original document on the first row of the recording medium as it moves in the forward direction;

reversing the direction of movement of the recording medium;

recording images of an original document on the second row of the recording medium as it moves in the reverse direction;

setting the amount of trailer transport on the second row of the recording medium on the basis of the amount of the leader transport to a second set value; and controlling the amounts of the leader transport and the trailer transport of the recording medium on the basis of the first and second set values.

21. A method according to claim 20, further comprising the steps of setting the amount of the trailer transport to be equal to the amount of the leader transport.

22. A method according to claim 20, further comprising the step of measuring a length of the recording medium, and starting the trailer transport when the amount of the recording medium on the second row measured reaches the amount of the trailer transport.

23. A method according to claim 20, further comprising the step of transporting a sheet-like original document and photographing an image of the original document while the original document and the recording medium are being transported.

* * * * *